(12) United States Patent
Macbeth

(10) Patent No.: US 6,433,977 B1
(45) Date of Patent: Aug. 13, 2002

(54) COMBO AFCI/GFCI WITH SINGLE TEST BUTTON

(75) Inventor: Bruce F. Macbeth, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 09/549,504

(22) Filed: Apr. 14, 2000

Related U.S. Application Data
(60) Provisional application No. 60/129,720, filed on Apr. 16, 1999.

(51) Int. Cl.$^7$ .................................................. H02H 3/00
(52) U.S. Cl. ........................ 361/42; 361/93.1; 324/536
(58) Field of Search ........................... 361/42, 45, 46, 361/115, 49, 50, 93.1; 324/536, 509, 500, 512

(56) References Cited

U.S. PATENT DOCUMENTS 5,224,006 A * 6/1993 MacKenzie et al. .......... 361/45
5,459,630 A * 10/1995 MacKenzie et al. .......... 361/45
5,963,406 A * 10/1999 Neiger et al. ................. 361/42
5,982,593 A * 11/1999 Kimblin et al. ............... 361/42

* cited by examiner

Primary Examiner—Kim Huynh
(74) Attorney, Agent, or Firm—Wall Marjama & Bilinski LLP

(57) ABSTRACT

A combination AFCI/GFCI includes a single test button which when pushed, tests both the arc fault and ground fault detection circuitry and the circuit interrupter. Closing the test button causes a simulated ground fault and enables a signal steering circuit. The steering circuit redirects the ground fault detector output to an arc fault simulator circuit which produces a simulated arcing pulses that are coupled, preferably by way of an extra winding, to an arc fault sensor transformer. The arc fault detector senses the arc fault simulator pulses coupled to the sensor transformer and, if everything is operating normally, triggers a switching device such as an SCR which activities a circuit interrupter. In this way, both the ground fault circuit interrupter and arc fault circuit interrupter functions are tested simultaneously, and the test is initiated by a single test button. When the circuit interrupter is not in the test mode, the steering circuitry is disabled and either a ground fault or an arc fault or both will independently activate the switching device and the circuit interrupter.

11 Claims, 2 Drawing Sheets

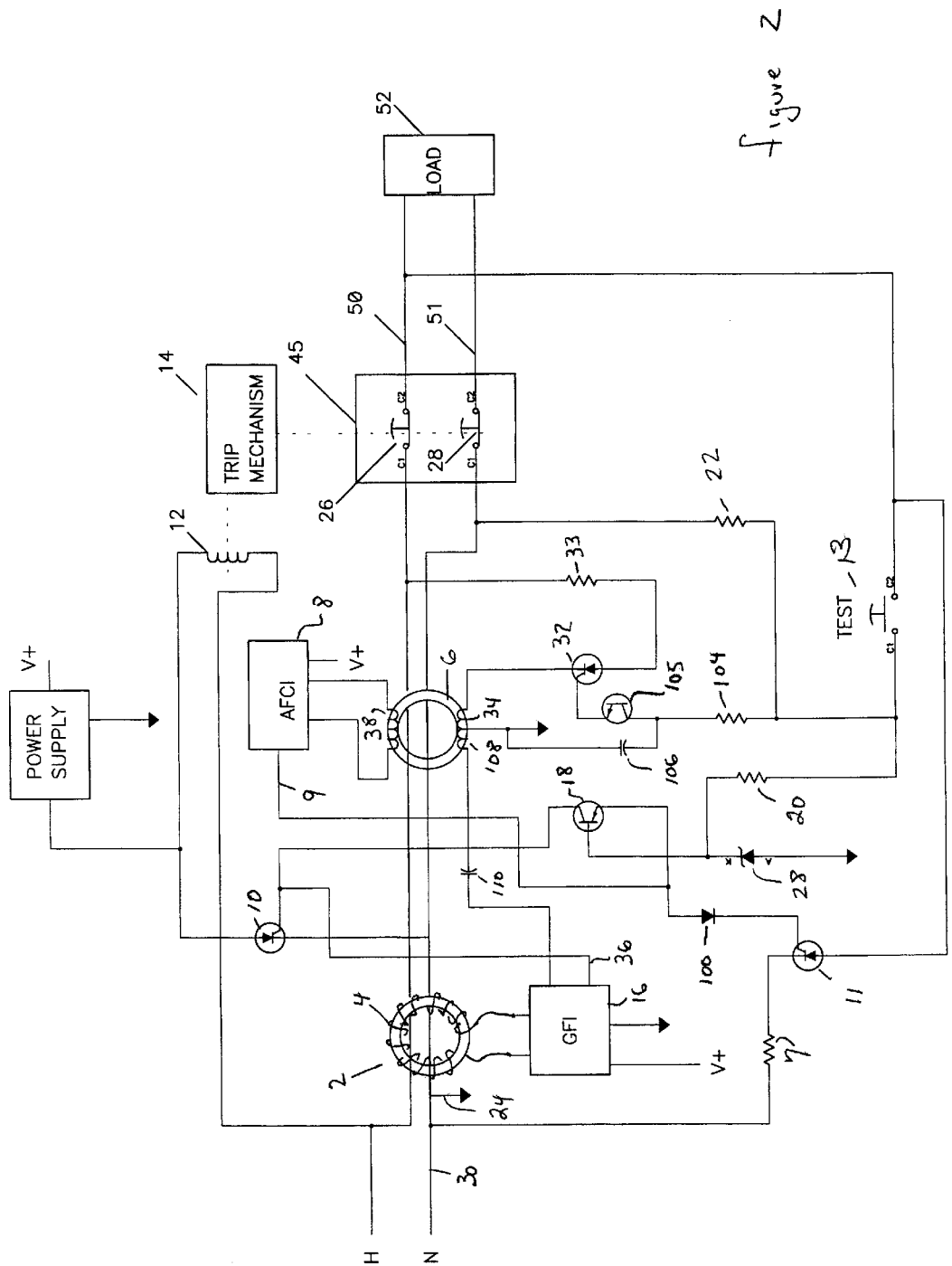

COMBO AFCI/GFCI WITH SINGLE TEST BUTTON

CROSS REFERENCE TO RELATED APPLICATIONS

This application claims priority from U.S. Provisional Application Ser. No. 60/129,720 filed Apr. 16, 1999.

FIELD OF THE INVENTION

This invention relates generally to circuit protectors and more particularly to a combination arc fault circuit interrupter and ground fault circuit interrupter (AFCI/GFCI) having a single test button for fully testing both the ground fault and arc fault detection circuits of the circuit protector.

BACKGROUND OF THE INVENTION

Ground fault circuit interrupters are well known in the prior art. Recently, there has been a demand for arc fault circuit interrupters that detect arcing on an electrical circuit and remove power from the circuit in response to the presence of arcing. Combination ground fault circuit interrupters and arc fault circuit interrupters respond to this demand.

Ground fault circuit interrupters conventionally include a test button for testing the ground fault sensing circuits and circuit interrupting circuits. Test circuits for testing an arc fault sensor and circuit interrupter also exist. Providing both arc fault circuit interrupter testing functions and ground fault circuit interrupter testing functions in combined devices is important for providing a practical device. Relying on two separate test circuits with two separate test buttons is cumbersome and inefficient and may not be acceptable to customers.

Accordingly, it is an object of this invention to provide a combination AFCI/GFCI having a single test button which when activated, fully tests both the ground fault and arc fault detection circuits and the interrupter circuit in the combination AFCI/GFCI.

Briefly stated, and in accordance with the presently preferred embodiment of the invention, a combination AFCI/GFCI includes a single test button which when activated, tests both the arc fault and ground fault detection circuitry and the circuit interrupter. Preferably, closing the test button causes a simulated ground fault and enables a signal steering circuit. The steering circuit redirects the ground fault detector output to an arc fault simulator circuit which produces a simulated arcing pulses that are coupled, preferably by way of an extra winding, to an arc fault sensor transformer. The arc fault detector senses the arc fault simulator pulses coupled to the sensor transformer and, if everything is operating normally, triggers a switching device such as an SCR which activities a circuit interrupter. In this way, both the ground fault circuit interrupter and arc fault circuit interrupter functions are tested simultaneously, and the test is initiated by a single test button. When the circuit interrupter is not in the test mode, the steering circuitry allows either a ground fault or an arc fault or both to independently activate the switching device and the circuit interrupter.

BRIEF DESCRIPTION OF THE DRAWINGS

The novel aspects of the invention are set forth with particularity in the appended claims. The invention itself, together with further objects and advantages thereof, may be more readily understood by a reference to the following detailed description of a presently preferred embodiment of the invention taken in conjunction with the accompanying drawing in which:

FIG. 2 illustrates a combo AFCI/GFCI in which both functions are tested with one test button which button first activates an arc fault simulator.

DESCRIPTION OF THE PREFERRED EMBODIMENT

Figure 1:
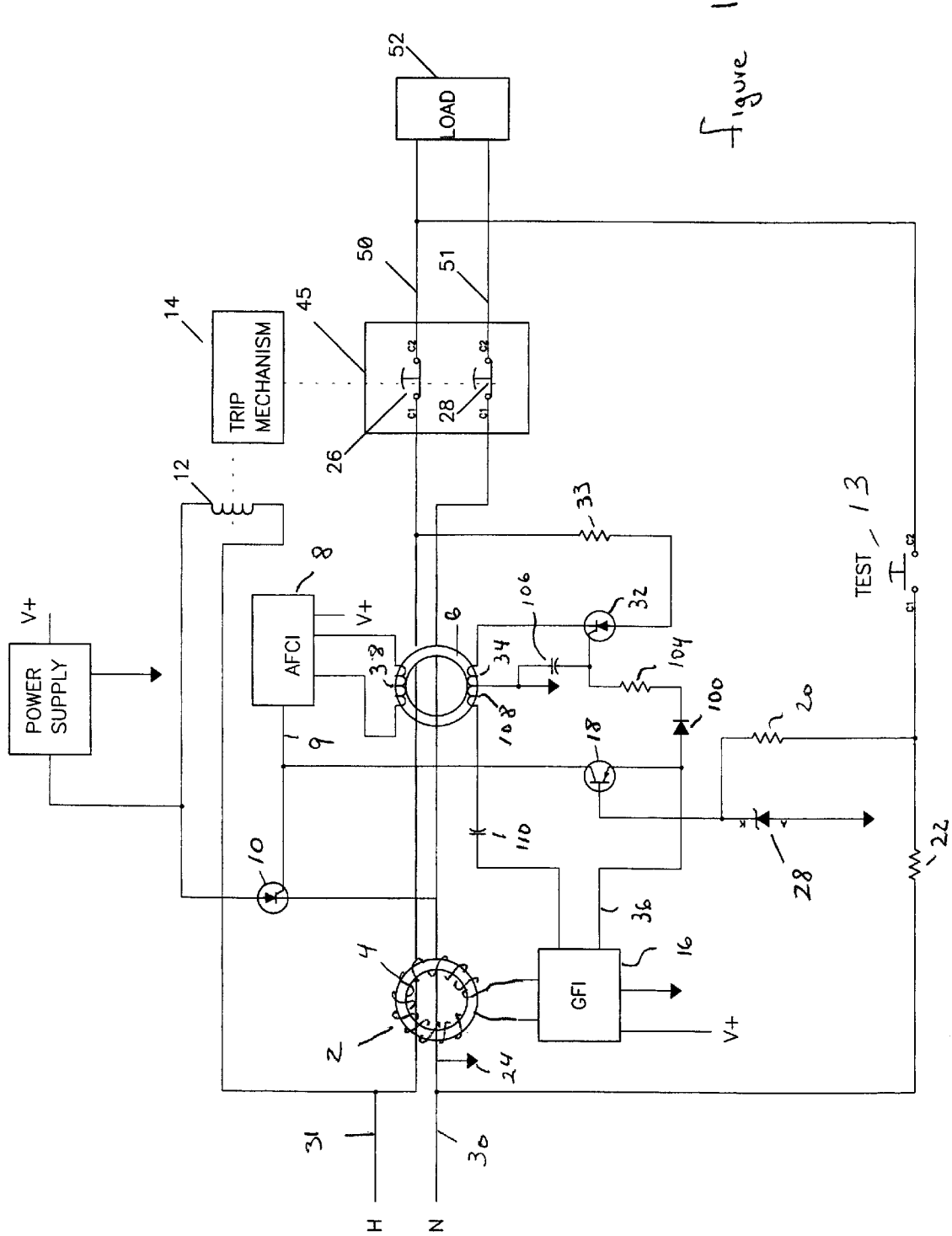
FIG. 1 illustrates a combo AFCI/GFCI in which both functions are tested with one test button which button first activates a ground fault simulator.

FIG. 1 is a part schematic, part block diagram of a combination arc fault circuit interrupter and a ground fault circuit interrupter with a single test button in accordance with this invention.

Referring now to FIG. 1, the combination arc fault circuit interrupter and ground fault circuit interrupter (AFCI/GFCI) protects an electrical circuit that includes at least a hot conductor 50 and a neutral conductor 51 connected between a source of power indicated with the letters H and N and a load 52. The circuit protector of this invention uses a circuit interrupter 45 that includes contacts 26 and 28 to interrupt power to load 52 in the event of either an arc fault or a ground fault. A trip mechanism 14 coupled to a solenoid coil 12 activates the circuit interrupter 45 in the event of a fault. Solenoid coil 12 is activated by a switching device such as a silicon controlled rectifier (SCR 10) connected in series circuit relationship with solenoid 12 between hot conductor 50 and neutral conductor 51. SCR 10 has a gate terminal that is connected to the output of an arc fault circuit detector 8, and, by way of steering transistor 18 to the output 36 of a ground fault circuit detector 16. Arc fault circuit detector 8 and ground fault circuit detector 16 are of conventional design, the details of which form no particular part of this invention.

Ground fault detector 16 is coupled to a sensor transformer 2 that includes a winding 4 wound around a torroidal core through which the hot conductor 50 and the neutral conductor 51 pass to form a transformer in which the hot and neutral conductors are the primary windings and the winding 4 is the secondary winding. Sensor 2 is responsive to an imbalance in the current in primary windings 50 and 51 to generate a signal that is detected by ground fault detector 16 which produces an output at output 36 which enables, and is applied through, steering transistor 18 to the gate of SCR 10. This energizes solenoid 12 which activates trip mechanism 14 to open circuit breaker 45 and disconnect load 52 from the power source. The steering transistor 18 operates when the detector 16 output 36 goes high, causing a series current to flow through the emitter base junction of PNP transistor 18, resistors 20 and 22 back to circuit common 24. This current biases transistor 18 into conduction which causes a steered current to flow from output 36 through the emitter-collector junction of transistor 18 to the gate of SCR 10, which SCR 10 activates the circuit interrupter.

The combination AFCI/GFCI includes a second sensing transformer 6, wound with unsymmetrical windings, so as to receive more of the flux in the hot wire than the neutral wire, or vise versa, for detecting arc faults. When an arc fault occurs in either the hot wire 50 or the neutral wire 51, or between the two wires, or from either to ground, a signal is produced at winding 38 proportional to the rate of change of current flowing in windings 50 and 51 with respect to time, which signal (di/dt) is detected by arc fault detector 8. When the signal indicates the presence of an actual arcing condition in accordance with pre-determined criteria, detector 8 produces an output at terminal 9 which triggers SCR 10 causing current to flow through solenoid 12 actuating trip mechanism 14 which activates circuit breaker 45 to disconnect load 52 from the power source. As explained above, either an arc fault, a ground fault, or both will cause activation of SCR 10 and operation of the circuit interrupter.

In accordance with the invention, a single test button 13 initiates testing of the ground fault detection function, the arc fault detection function and the circuit interrupter function of the combined GFCI/AFCI. When button 13 is closed, current flows from hot conductor 50 through resistor 22 to neutral conductor 51. This causes a current imbalance, as described before, which produces a signal at the output of winding 4 of sensor 2. The signal is detected by ground fault sensor 16 which produces a series of pulses at output 36. Simultaneously, when test button 13 is closed, current flows through resister 20 into clamping zener diode 28, which current acts to clamp zener diode 28, said clamp voltage applied across the base-emitter junction of transistor 18 which acts to hold the transistor off. The output pulses produced by ground fault detector 16 are thereby isolated from the gate of SCR 10 which prevents the SCR from being turned on and causing current to flow through solenoid 12 activating trip mechanism 14 and circuit breaker 45. Instead, current flows through a blocking diode 100 to a filter that includes a resistor 104 and a capacitor 106, the output of which filter is connected to a gate terminal of an SCR 32. SCR 32 is connected in series with a resistor 33 between hot conductor 50 and one side of winding 34 of arc fault sensor 6, with the other side of winding 34 connected to circuit common 24. The series of pulses produced at output 36 of ground fault detector 16 is delayed by the filter so that SCR 32 is repeatedly turned on near the peak of the power line current, thereby causing a pulse of current to flow through winding 34 simulating an arc fault. The simulated arc fault produces a signal in winding 38 which is connected to arc fault detector 8 which interprets the signals as indicating the presence of an arc and produces an output at terminal 9 which activates SCR 10, energizing solenoid coil 12 to activate trip mechanism 14 and circuit breaker 45 to disconnect the load 52 from the power source. It can be seen from this description that test button 13 sequentially tests ground fault sensor 2, ground fault detector 16, arc fault sensor 6, arc fault detector 8, SCR 10, solenoid 12, trip mechanism 14 and circuit breaker 45, all of the active components of the combination GFCI/AFCI.

Preferably, in accordance with another feature of this invention, a second winding 108 is wound on the core of arc fault sensor 6 with one side connected to common 24. The other side of winding 108 is connected to ground fault detector 16 through series capacitor 110 in a way which causes transformer 6 to act as a grounded neutral dormant oscillator transmitter which is responsive to a grounded neutral fault condition, and which transmitter transmits a current through the neutral wire or hot wire in case of a miswire, during a grounded neutral fault, which current is sensed by transformer 2 as a ground fault, which in turn activates the circuit breaker 45 in the manner already described.

Referring now to FIG. 2, a second embodiment of the invention, in which like parts are numbered the same as in FIG. 1, and wherein once again the combination arc fault circuit interrupter and ground fault circuit interrupter (AFCI/GFCI) protects an electrical circuit that includes at least a hot conductor 50 and a neutral conductor 51 connected between a source of power indicated with the letters H and N and a load 52. This circuit operates in the inverse of the circuit of FIG. 1, wherein arc fault detection is first activated by the test button 13. All else is the same as described above except for the following differing description. When an arc fault occurs in either the hot wire 50 or the neutral wire 51, or between the two wires, or from either to ground, a signal is produced at winding 38 proportional to the rate of change of current flowing in windings 50 and 51 with respect to time, which signal (di/dt) is detected by arc fault detector 8. When the signal indicates the presence of an actual arcing condition in accordance with predetermined criteria, detector 8 produces an output at terminal 9 which enables, and is applied through, steering transistor 18.

The steering transistor 18 activates when the detector 8 output 9 goes high, causing a current to flow through the series string of the emitter base junction of PNP transistor 18, resistors 20 and 22, then back to circuit common 24. This current biases transistor 18 into conduction which causes a steered current to flow from output 9 through the emitter collector junction of transistor 18 to the gate of, and activating, SCR 10. Activating SCR 10 causes current to flow through solenoid 12 actuating trip mechanism 14 which activates circuit breaker 45 to disconnect load 52 from the power source.

In accordance with the invention, a single test button 13 initiates testing of the ground fault detection function and the arc fault detection function and the circuit interrupter function of the combined GFCI/AFCI. When test button 13 is closed, current flows from hot conductor 50 to a delay filter composed of resistor 104 and capacitor 106, said capacitor 106 charging to the trigger voltage of a diac 105 near the peak of the AC power wave, wherein said diac 105 triggers SCR 32 into conduction. SCR 32 is connected in series with a resistor 33 between hot conductor 50 and one side of winding 34, of arc fault sensor 6, with the other side of winding 34 connected to common 24. The diac 105 is repeatedly triggered at or near the peak of the AC wave as long as test button 13 is held closed which causes repeated activation of SCR 32. Each activation of SCR 32 causes a pulse of current to flow through winding 34 simulating an arc fault. The simulated arc fault produces a signal in winding 38 which is connected to arc fault detector 8, which interprets the signals as indicating the presence of an arc fault, thereby producing a series of pulses at output 9. Simultaneously, when test button 13 is closed, current flows through resister 20 into clamping zener diode 28, which current acts to clamp zener diode 28, said clamp voltage being applied across the base-emitter junction of transistor 18 which acts to hold the transistor 18 off. The output pulses produced by arc fault detector 8 are thereby isolated from the gate of SCR 10 which prevents the SCR 10 from being activated. Instead, current flows through blocking diode 100 to the gate of SCR 11 activating the SCR 11 and causing a ground fault simulation current to flow from hot load wire 50 through the anode-cathode of SCR 11, then resistor 7, and returning to line neutral 30. This current causes a current imbalance as described above at the output of winding 4 of sensor 2. The signal is detected by ground fault detector 16, which activates output 36, which in turn activates SCR 10, causing a circuit interruption as described above.

It can be seen from this description that test button 13 sequentially tests arc fault sensor 6, arc fault detector 8, ground fault sensor 2, ground fault detector 16, SCR 10, solenoid 12, trip mechanism 14 and circuit breaker 45, all of the active components of the combination GFCI/AFCI.

Also, as described above, winding 108 acts as a grounded neutral dormant oscillator transmitter.

While the invention has been described in connection with the presently preferred embodiment thereof, those skilled in the art will recognize that certain modifications and changes may be made therein without departing from the true spirit and scope of the invention which accordingly is intended to be defined solely by the appended claims.

What is claimed is:

1. A combination arc fault circuit interrupter and ground fault circuit interrupter having a self test feature activated by a single button comprising:
   a circuit interrupter;
   a ground fault detector connected to the circuit interrupter for activating the circuit interrupter when a ground fault is detected;
   an arc fault detector connected to the circuit interrupter for activating the circuit interrupter when an arc fault is detected;
   a steering circuit for disconnecting the output of one of the ground fault and arc fault detectors from the circuit interrupter and connecting it to the other of the arc fault and ground fault detectors; and
   a test button connected to one of the arc fault detector and ground fault detector, and to the steering circuit, in which activation of the test button activates one of the arc fault detector and ground fault detectors, which in turn activates the other of the arc fault detector and ground fault detector which in turn activates the circuit interrupter;
   in which the steering circuit comprises a transistor connecting the ground fault detector to the circuit interrupter when the transistor is turned on, and disconnecting the ground fault detector from the circuit interrupter when the transistor is turned off.

2. A combination arc fault circuit interrupter and ground fault circuit interrupter having a self test feature activated by a single button comprising:
   a circuit interrupter;
   a ground fault detector connected to the circuit interrupter for activating the circuit interrupter when a ground fault is detected;
   an arc fault detector connected to the circuit interrupter for activating the circuit interrupter when an arc fault is detected;
   a steering circuit for disconnecting the output of one of the ground fault and arc fault detectors from the circuit interrupter and connecting it to an input of the other of the arc fault and ground fault detectors; and
   a test button connected to one of the arc fault detector and ground fault detector, and to the steering circuit, in which activation of the test button activates one of the arc fault detector and ground fault detectors, which in turn activates the other of the arc fault detector and ground fault detector which in turn activates the circuit interrupter.

3. The combination arc fault circuit interrupter and ground fault circuit interrupter of claim 2 comprising an input of an arc fault simulating circuit connected to an output of the ground fault detector.

4. The combination arc fault circuit interrupter and ground fault circuit interrupter of claim 2 comprising an input of an ground fault simulating circuit connected to an output of the arc fault detector.

5. The combination arc fault circuit interrupter and ground fault circuit interrupter having a self test feature activated by a single button comprising:
   a circuit interrupter;
   a ground fault detector connected to the circuit interrupter for activating the circuit interrupter when a ground fault is detected;
   an arc fault simulating circuit connected to an output of the ground fault detector;
   an arc fault detector connected to the circuit interrupter for activating the circuit interrupter when an arc fault is detected;
   a steering circuit for disconnecting the output of one of the ground fault and arc fault detectors from the circuit interrupter and connecting it to the other of the arc fault and ground fault detectors; and
   a test button connected to one of the arc fault detector and ground fault detector, and to the steering circuit, in which activation of the test button activates one of the arc fault detector and ground fault detectors, which in turn activates the other of the arc fault detector and ground fault detector which in turn activates the circuit interrupter;
   in which the arc fault simulating circuit comprises an SCR having a gate terminal connected to the output of the ground fault detector and a switched terminal connected to the arc fault detector.

6. A combination arc fault circuit interrupter and ground fault circuit interrupter having a self test feature activated by a single button comprising:
   a circuit interrupter;
   a ground fault detector connected to the circuit interrupter for activating the circuit interrupter when a ground fault is detected;
   an arc fault detector connected to the circuit interrupter for activating the circuit interrupter when an arc fault is detected;
   a ground fault simulating circuit connected to an output of the arc fault detector;
   a steering circuit for disconnecting the output of one of the ground fault and arc fault detectors from the circuit interrupter and connecting it to the other of the arc fault and ground fault detectors; and
   a test button connected to one of the arc fault detector and ground fault detector, and to the steering circuit, in which activation of the test button activates one of the arc fault detector and ground fault detectors, which in turn activates the other of the arc fault detector and ground fault detector which in turn activates the circuit interrupter;
   in which the ground fault simulating circuit comprises an SCR having a gate terminal connected to the output of the arc fault detector and a switched terminal connected to the ground fault detector.

7. The combination arc fault circuit interrupter and ground fault circuit interrupter of claim 2 in which the ground fault detector comprises a sensor coupled to a circuit being protected, and the test button is connected to the circuit being protected to cause a current imbalance in the circuit being protected when the button is activated.

8. A combination arc fault circuit interrupter and ground fault circuit interrupter in which activating a single test button tests both the arc fault and ground fault interruption capability at the same time including:
   a ground fault sensor;
   a ground fault detector connected to the ground fault sensor;
   an arc fault sensor coupled to the circuit being protected;
   an arc fault detector coupled to the arc fault sensor;
   an arc fault simulator circuit coupled to the arc fault sensor;

a ground fault simulator circuit coupled to the circuit being protected;

a test button connected to the ground fault simulator;

a circuit interrupter connected to the ground fault detector and to the arc fault detector for interrupting the circuit being protected if either a ground fault or an arc fault is detected;

a steering circuit which prevents the ground fault detector from activating the circuit interrupter;

in which activation of the test button activates the ground fault simulator circuit, which in turn activates the ground fault detector, which in turn activates the arc fault simulator circuit, which in turn introduces an arc fault simulated signal into the arc fault sensor, which in turn activates the arc fault detector which activates the circuit interrupter.

9. A combination arc fault circuit interrupter and ground fault circuit interrupter in which activating a single test button tests both the arc fault and ground fault interruption capability at the same time including:

a ground fault sensor;

a ground fault detector connected to the ground fault sensor;

an arc fault sensor coupled to the circuit being protected;

an arc fault detector coupled to the arc fault sensor;

an arc fault simulator circuit coupled to the arc fault sensor;

a ground fault simulator circuit coupled to the circuit being protected;

a test button connected to the arc fault simulator;

a circuit interrupter connected to the ground fault detector and to the arc fault detector for interrupting the circuit being protected if either a ground fault or an arc fault is detected;

a steering circuit which prevents the arc fault detector from activating the circuit interrupter;

in which activation of the test button activates the arc fault simulator circuit, which in turn activates the arc fault detector, which in turn activates the ground fault simulator circuit, which in turn introduces a ground fault simulated signal into the ground fault sensor, which in turn activates the ground fault detector which activates the circuit interrupter.

10. A combination arc fault circuit interrupter and ground fault circuit interrupter in which activating a single test button tests both the arc fault and ground fault interruption capability at the same time, comprising:

a ground fault sensor;

a ground fault detector connected to the ground fault sensor;

an arc fault sensor coupled to the circuit being protected;

an arc fault detector coupled to the arc fault sensor;

an arc fault simulator circuit coupled to the arc fault sensor;

a ground fault simulator circuit coupled to the circuit being protected;

a test button connected to the ground fault simulator;

a circuit interrupter connected to the ground fault detector and to the arc fault detector for interrupting the circuit being protected if either a ground fault or an arc fault is detected;

in which activation of the test button activates the ground fault simulator circuit, which in turn activates the ground fault detector, which in turn activates the arc fault simulator circuit, which in turn introduces an arc fault simulated signal into the arc fault sensor, which in turn activates the arc fault detector which activates the circuit interrupter; and in which the arc fault sensor comprises a transformer serving as a combination grounded neutral dormant oscillator and arc fault sensor in which hot and neutral load wires of a circuit being protected form one turn primaries.

11. A combination arc fault circuit interrupter and ground fault circuit interrupter in which activating a single test button tests both the arc fault and ground fault interruption capability at the same time, comprising:

a ground fault sensor;

a ground fault detector connected to the ground fault sensor;

an arc fault sensor coupled to the circuit being protected;

an arc fault detector coupled to the arc fault sensor;

an arc fault simulator circuit coupled to the arc fault sensor;

a ground fault simulator circuit coupled to the circuit being protected;

a test button connected to the arc fault simulator;

a circuit interrupter connected to the ground fault detector and to the arc fault detector for interrupting the circuit being protected if either a ground fault or an arc fault is detected;

in which activation of the test button activates the arc fault simulator circuit, which in turn activates the arc fault detector, which in turn activates the ground fault simulator circuit, which in turn introduces a ground fault simulated signal into the ground fault sensor, which in turn activates the ground fault detector which activates the circuit interrupter; and in which the arc fault sensor comprises a transformer serving as a combination grounded neutral dormant oscillator and arc fault sensor in which hot and neutral load wires of a circuit being protected form one turn primaries.

* * * * *